(12) United States Patent
Risch

(10) Patent No.: US 11,097,706 B2
(45) Date of Patent: Aug. 24, 2021

(54) BRAKE SYSTEM FOR A VEHICLE, AND CONTROL DEVICE FOR A BRAKE SYSTEM, AND METHOD FOR BRAKING A VEHICLE

(71) Applicants: HYUNDAI MOTOR COMPANY, Seoul (KR); KIA MOTORS CORPORATION, Seoul (KR)

(72) Inventor: Sven Risch, Ruesselsheim (DE)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 296 days.

(21) Appl. No.: 16/459,999

(22) Filed: Jul. 2, 2019

(65) Prior Publication Data

US 2020/0324747 A1    Oct. 15, 2020

(30) Foreign Application Priority Data

Apr. 11, 2019 (DE) .......................... 102019205266.5

(51) Int. Cl.
| | |
|---|---|
| *B60T 8/74* | (2006.01) |
| *B60T 8/1755* | (2006.01) |
| *B60T 8/171* | (2006.01) |
| *B60T 8/40* | (2006.01) |
| *B60T 8/1761* | (2006.01) |
| *B60W 30/02* | (2012.01) |

(52) U.S. Cl.
CPC ............ *B60T 8/1755* (2013.01); *B60T 8/171* (2013.01); *B60T 8/1761* (2013.01); *B60T 8/4013* (2013.01); *B60W 30/02* (2013.01)

(58) Field of Classification Search
CPC ...... B60T 8/1755; B60T 8/171; B60T 8/1761; B60T 8/17554; B60T 8/17551; B60T 8/172; B60T 8/1764
See application file for complete search history.

(56) References Cited

U.S. PATENT DOCUMENTS

| | | | | |
|---|---|---|---|---|
| 4,921,312 A | * | 5/1990 | Harris ..................... | B60T 8/173 303/116.1 |
| 5,816,670 A | * | 10/1998 | Yamada .............. | B60T 8/17636 303/194 |
| 6,238,021 B1 | * | 5/2001 | Sugimoto ............. | B60T 8/1755 303/193 |

(Continued)

FOREIGN PATENT DOCUMENTS

WO    2017/186911 A1    11/2017

*Primary Examiner* — Nicholas J Lane

(57) ABSTRACT

A method for braking a vehicle may include performing a first anti-locking brake system operation when a bump parameter of the vehicle exceeds a predetermined bump parameter threshold. A first braking force may be applied to each wheel, the first braking force being controlled such that a slip rate of each wheel lies within a predetermined first range. The method may include performing a second anti-locking brake system operation when the bump parameter is below the predetermined bump parameter threshold and when a slip rate of one or more of the wheels exceeds a predetermined slip rate threshold, including applying a second braking force to each wheel, wherein the second braking force is controlled such that the slip rate of each wheel is set so that the yaw rate of the vehicle lies within a predetermined yaw rate range.

9 Claims, 3 Drawing Sheets

(56) References Cited

U.S. PATENT DOCUMENTS

| | | | | |
|---|---|---|---|---|
| 2002/0056582 A1* | 5/2002 | Chubb | ............... | B60T 8/17551 |
| | | | | 180/197 |
| 2003/0066720 A1* | 4/2003 | Sakamoto | ............ | B60T 8/3225 |
| | | | | 188/177 |
| 2004/0124701 A1 | 7/2004 | Nihei et al. | | |
| 2004/0128052 A1* | 7/2004 | Nihei | ................... | B60T 8/1764 |
| | | | | 701/71 |
| 2008/0312793 A1* | 12/2008 | Schutz | ................. | B60T 8/1764 |
| | | | | 701/42 |
| 2016/0144841 A1* | 5/2016 | White | ............... | B60T 8/17616 |
| | | | | 701/70 |

\* cited by examiner

_US 11,097,706 B2_

BRAKE SYSTEM FOR A VEHICLE, AND CONTROL DEVICE FOR A BRAKE SYSTEM, AND METHOD FOR BRAKING A VEHICLE

CROSS-REFERENCE TO RELATED APPLICATION

This application claims priority to and the benefit of German Patent Application No. 102019205266.5, filed on Apr. 11, 2019, the entire contents of which are incorporated herein by reference.

FIELD

The present disclosure relates a brake system for a vehicle, a control device for a brake system, and a method for braking a vehicle.

BACKGROUND

The statements in this section merely provide background information related to the present disclosure and may not constitute prior art.

Brake systems for vehicles usually include a hydraulic brake circuit including various hydraulic components such as plungers, pumps, valves, and wheel cylinders for generating a braking force, and a control device configured to control the hydraulic components of the hydraulic brake circuit. Typically, the control device is configured to control the brake force such that an anti-locking brake system operation (also known as ABS operation) is performed, wherein during anti-locking brake system operation a wheel of the vehicle is prevented from locking.

Typically, during anti-locking brake system operation, the brake force is controlled based on input of wheel speed sensors and, hence, on a slip rate of the respective wheel. Consequently, in situations where different wheels of the vehicle are in contact with road surfaces having different friction coefficients, different slip rates and decelerations occur at the respective wheels. In order to stabilize the vehicle in such situations, e.g. in order to prevent skidding, the brake force is controlled such that the brake force applied to the wheels being in contact with a low friction is decreased such that locking is avoided.

For example, document US 2004/0124701 A1 describes a brake control method for a vehicle, wherein a braking force is applied to each wheel of the vehicle so that an actual slip rate matches a target slip rate, the target slip rate being set so as to prevent the actual slip rate of the wheel from exceeding a reference value in order to avoid locking of the wheel depending on a friction value of the road surface. The target slip rate is further controlled such that an actual yaw rate of the vehicle matches a target yaw rate, whereby the vehicle behavior during braking operation is stabilized.

Another approach to improve stability of vehicle behavior is described in WO 2017/186911 A1 which discloses a continuous variable transmission for a vehicle, wherein, based on information representing an upcoming road condition such as slope, curbs, or road roughness, clamping force urged by a friction element onto a transmission member is varied.

In some situations, however, for example during race track driving, rally driving, or off road driving, controlling the braking force based on the slip rate of the wheel can lead to increased stopping distances of the vehicle. For example, during race track or off-road driving, one or more wheels may contact the surface with decreased contact force or may even temporarily lift from the road surface, e.g. when the wheel drives over a curb or another obstacle. When braking operation is performed during such situations, the lifted wheel or the wheel being in reduced contact with the road surface may be considered as being in contact with a low friction road surface. Consequently, the controller instantly controls the hydraulic components of the brake circuit to perform an anti-locking brake system operation with reduced brake force at those wheels. When the wheels come again into contact with the road surface or when the contact force increases again, it typically takes some time until the braking force is increased at those due to system loop time to redefine the situation. This time, which is required by the system to go again through a loop for making a decision on the situation at each wheel, may increase braking distance.

SUMMARY

The present disclosure to provides solutions for braking a vehicle, in particular when braking a vehicle driving over an obstacle or unevenness.

The present disclosure may relates to a method for controlling braking; a non-transitory, computer readable data storage medium for the same; a control device for the same; or a brake system.

A first aspect of the disclosure relates to a method for braking a vehicle including at least a first axle and a second axle, each axle having two wheels disposed thereupon. The method may include capturing at least one of a roll rate of the vehicle and an acceleration of the vehicle against gravity direction as a bump parameter. The roll rate may be defined as an angular velocity by which the vehicle is rotated about its longitudinal axis. For example, the roll rate may be captured by an angular rate sensor such as a gyroscope configured to measure angular movement or acceleration. The acceleration of the vehicle against gravity direction may be measured with the same sensor device as the roll rate or a different sensor device configured to capture axial acceleration. The roll rate and the acceleration against gravity direction are parameters that indicate that the vehicle is driving with one or more wheels over an obstacle in the road surface, e.g. a curb, a hole, a stone or similar unevenness which may cause a decrease in contact force between the respective wheel and the road surface or may even cause the contact force to become zero when the respective wheel lifts from the road surface.

Further, a wheel speed of each wheel and a yaw rate of the vehicle are captured. The wheel speed may be measured with conventional wheel speed sensors, e.g. as an angular velocity. The yaw rate may be defined as an angular velocity by which the vehicle is rotated about its vertical axis. For example, the yaw rate may be captured by an angular rate sensor such as a gyroscope configured to measure angular movement. In particular, the same sensor device can be used for measuring the roll rate and the yaw rate of the vehicle.

In one step of the method, a slip rate of each wheel is determined based on the captured wheel speeds. This may include calculating a mean value of the wheel speeds and a difference between said mean value and each captured actual wheel speed, wherein the difference between the mean value and the actual wheel speed represents the slip rate of the respective wheel.

According to the disclosure, a first anti-locking brake system operation is performed when the bump parameter exceeds a predetermined bump parameter threshold. That is, when the roll rate of the vehicle and/or the acceleration against gravity of the vehicle exceed a threshold, the first anti-locking brake system operation is performed. The first anti-locking brake system operation may include applying a first braking force to the each wheel, wherein the first braking force is controlled such that a slip rate of each wheel lies within a predetermined first or slip rate range. In particular, the individual braking force of each wheel is controlled such that the slip rate of each wheel is below a first threshold value so as to avoid locking of the vehicle. However, the slip rate of all wheels is controlled to fall within the same range, i.e. the predetermined first range.

A second anti-locking brake system operation is only performed when the bump parameter is below the predetermined bump parameter threshold and when the slip rate of one or more of the wheels exceeds a predetermined slip rate threshold. That is, when it is detected that the vehicle is driving on a more or less even road surface, i.e. when the roll rate and/or the acceleration against gravity direction of the vehicle are below their respective threshold, and when it is detected that one of the wheels starts locking which is represented by a high slip rate of this wheel, the second anti-locking brake system operation is performed. The second anti-locking brake system operation may include applying a second braking force to each wheel, wherein the second braking force is controlled such that the slip rate of each wheel is set so that the yaw rate of the vehicle lies within a predetermined yaw rate range. Hence, in the second anti-locking brake system operation the brake force of each wheel is not controlled so that the wheel may include a slip rate falling within the first range but to such slip rate that avoids locking of the wheels and keeps the vehicle yaw rate within certain boundaries in order to stabilize the vehicle when wheels of one axle are in contact with areas of the road surface including different friction or roughness values.

According to a second aspect of the disclosure, a computer readable, non-transitory data storage medium storing a software program is provided, the software program being configured to cause a computer to execute the steps of a method according to the first aspect of the disclosure. The non-transitory storage medium may for example be realized as a hard drive, a CD-ROM, a DVD, a Blu-Ray disc, a floppy disc, a flash memory such as a flash EEPROM, or similar.

A third aspect of the disclosure provides a control device for a brake system of a vehicle including at least a first axle and a second axle, each axle having two wheels disposed thereon. The control device may include a first connection interface configured to receive data representing at least one of a roll rate of the vehicle and an acceleration of the vehicle against gravity direction as a bump parameter, data representing a wheel speed of each wheel of the vehicle, and data representing a yaw rate of the vehicle.

The control device may further include a second connection interface configured to transmit control commands to a hydraulic brake circuit of the brake system. The first and second connection interfaces are configured for data communication and may be realized as wireless or wire bound interface. E.g. the interfaces may be realized as bus interfaces, for example as CAN-BUS-interfaces or USB-interfaces. Of course it is also possible to realize the interfaces as WIFI or other wireless interfaces.

The control device is further configured to
  determine a slip rate of each wheel based on the received wheel speeds,
  generate first control commands for the hydraulic brake circuit for a first anti-locking brake system operation when the bump parameter exceeds a predetermined bump parameter threshold, the first anti-locking brake system operation including applying a first braking force to the each wheel, wherein the first braking force is controlled such that a slip rate of each wheel lies within a predetermined first range, and
  generate second control commands for the hydraulic brake circuit for a second anti-locking brake system operation when the bump parameter is below the predetermined bump parameter threshold and when the slip rate of one or more of the wheels exceeds a predetermined slip rate threshold, the second anti-locking brake system operation including applying a second braking force to each wheel, wherein the second braking force is controlled such that the slip rate of each wheel is set so that the yaw rate of the vehicle lies within a predetermined yaw rate range.

Hence, the control device, which may also be referred to as the controller, may be configured to cause a hydraulic brake circuit of a brake system of a vehicle to perform the first and second anti-locking brake system operation of the method according to the first aspect of the disclosure.

According to a fourth aspect of the disclosure, a brake system for a vehicle is provided, the vehicle including at least a first axle and a second axle, each axle having two wheels disposed thereon. The brake system may include a hydraulic brake circuit configured to apply a braking force to each wheel in accordance with a control command, and a control device according to the third aspect of the disclosure, wherein the second connection interface is connected to the hydraulic brake circuit. That is, the hydraulic brake circuit is configured to apply a braking force individually to each wheel of the vehicle in accordance with or based on the first and second control commands generated by the control device.

One of the underlying concepts of the disclosure is to perform a first anti-locking brake system operation, during which the slip rates of the vehicles are set by the brake force to fall within a common range and such that locking of the wheels is avoided, when it is determined that the vehicle has passed or is passing an obstacle in the road surface, and to perform a second anti-locking brake system operation, during which the slip rates of the vehicle are set by the brake force such that the yaw rate of the vehicle is restricted to stabilize the vehicle, only when it is determined that the vehicle is driving on a more or less even road surface. This decision between the brake operation modes reliably avoids that, when the vehicle drives over an obstacle with the consequence that the contact force between one or more wheels and the road surface is reduced more than a threshold value, the braking force of those one or more wheels is reduced in order to lower the slip rate of the respective wheels before it is recognized that the roughness of the road surface would allow for higher braking forces. This is a particular advantage when driving over an obstacle with high velocity, e.g. a curb on a race track. In those situations typically the contact force is reduced remarkably and the erroneous detection of a high slip rate of the wheels with reduced contact force would cause increased braking distance due to the reduced braking force and further due to the time which is necessary to increase the braking force again when the slip rate has become lower again.

According to one aspect of the method, in the first anti-locking brake system operation, the first slip rate range is set such that a difference in the slip rates of the wheels is smaller than 10 percent, preferably smaller than 5 percent. That is, in the first anti-locking brake system operation the first brake force is controlled such that all wheels have substantially the same slip rate. Thereby, particular high deceleration of the vehicle can be achieved.

According to a further aspect, the method may include determining whether the wheel speed of one wheel of a driven axle of the first and second axles exceeds a predetermined upper wheel speed threshold as a further bump parameter. In situations where the contact force between a wheel of a driven axle and the road surface is reduced, this wheel of the driven axle may slip and, hence, rotate with very high speed compared to the other wheels. This may be an indication that the vehicle has passed or passes an obstacle. By monitoring the wheel speeds of the wheels of the driven axle in addition to the roll rate and/or the acceleration of the vehicle against the gravity direction, the first or the second anti-locking brake system operation may be chosen with even increased reliability.

According to a further aspect, the method may include determining whether the wheel speed of one wheel a non-driven axle of the first and second axles falls below a predetermined lower wheel speed threshold as a further bump parameter. In situations where the contact force between the wheel of a non-driven axle and the road surface is reduced, this wheel of the non-driven axle may rotate with reduced speed compared to the other wheels. By monitoring the wheel speeds of the wheels of the non-driven axle in addition to the roll rate and/or the acceleration of the vehicle against the gravity direction, the first or the second anti-locking brake system operation may be chosen with even increased reliability.

According to an aspect, the control device may include a non-transitory data storage medium according to the second aspect of the disclosure and a computer configured to read data from the data storage medium and to generate the first and second control commands. The computer may for example be realized as a processing unit such as a CPU, an FPGA, a CPLD or similar.

The here described features for the method are also disclosed for the non-transitory data storage medium, the control device, the brake system, and vice versa.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 3:
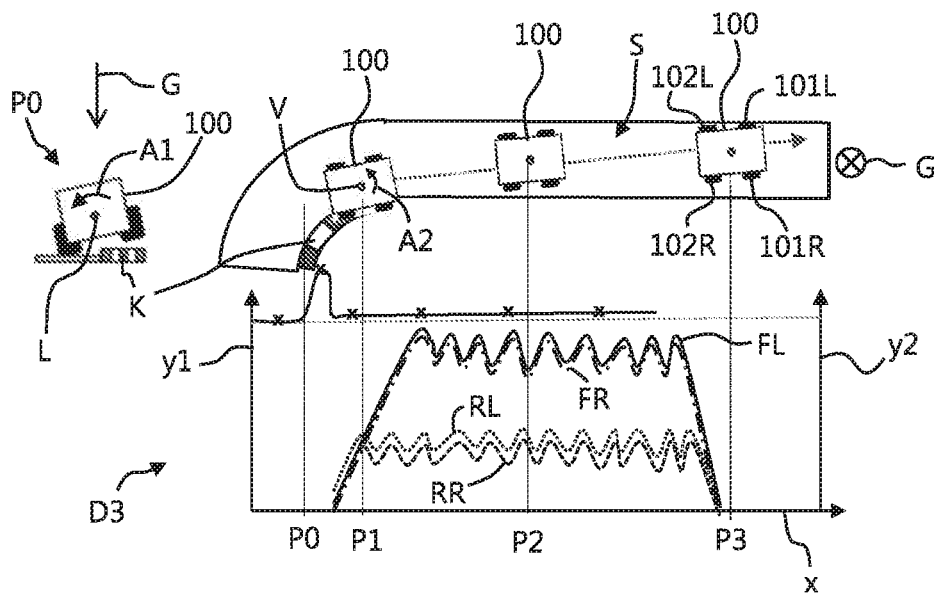
Figure 4:
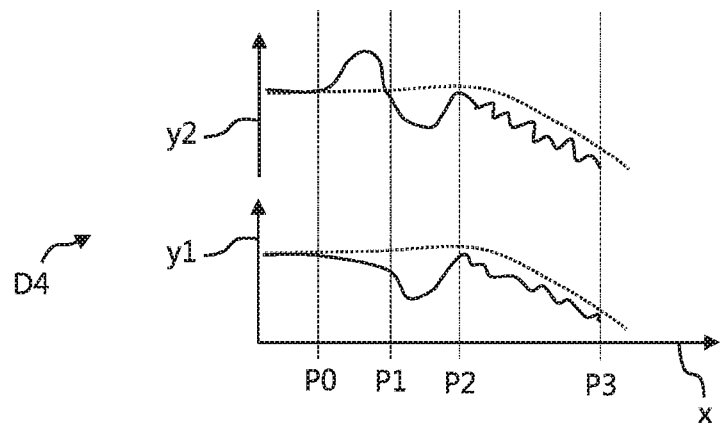
Figure 5:
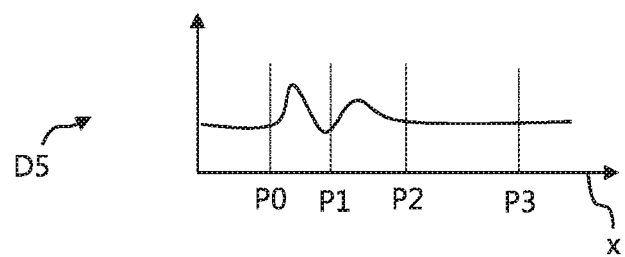
Figure 6:
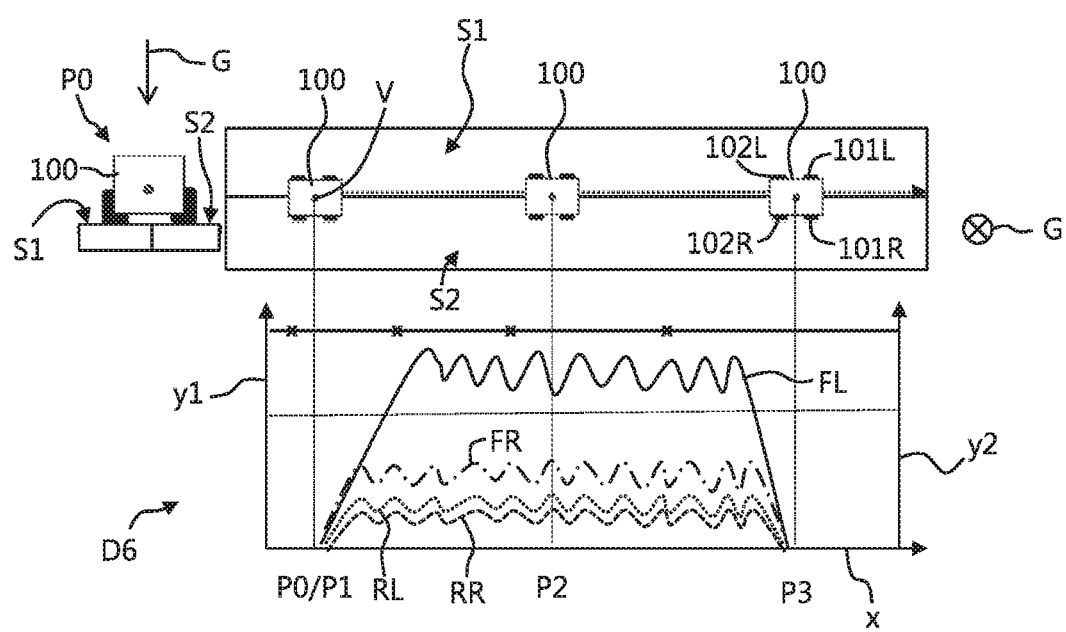

FIG. 3 schematically depicts a situation of a braking a vehicle by means of a method according to an aspect of the disclosure, when the vehicle is driving over an obstacle;

FIG. 4 shows the course of a wheel speed of a wheel of a driven axle of a vehicle and of a wheel speed of a wheel of a non-driven axle of the vehicle when the vehicle is braked by means of a method according to an aspect of the disclosure, when the vehicle is driving over an obstacle;

FIG. 5 shows the course of a roll rate of a vehicle when the vehicle is driving over an obstacle; and FIG. 6 schematically depicts a situation of a braking a vehicle by means of a method according to an aspect of the disclosure, when the vehicle is driving on a substantially planar road surface having different friction values at different areas.

Unless indicated otherwise, like reference numbers or signs to the figures indicate like elements.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
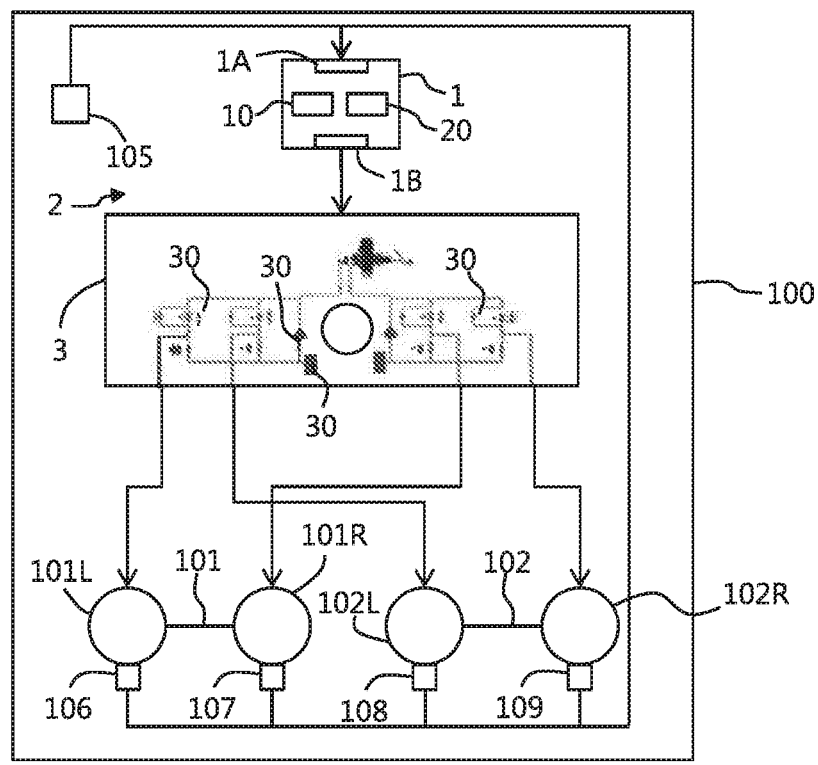
FIG. 1 shows a block diagram of a vehicle including a brake system according to an aspect of the disclosure.

FIG. 1 exemplarily shows a functional block diagram of a vehicle 100. The vehicle 100 includes a first axle 101, e.g. a front axle, and a second axle 102, e.g. a rear axle, a brake system 2, a kinematic sensor device 105, and a set of wheel speed sensors 106, 107, 108, 109.

The first axle 101 is associated with a left wheel 101L and a right wheel 101R. The second axle 102 is associated with a left wheel 102L and a right wheel 102R, too. One or both of the axles 101, 102 may be driven by a motor (not shown). The vehicle 100 exemplarily shown in FIG. 1 is realized as a four wheeled vehicle such as an automobile. However, the vehicle 100 may also be of any other type of two track vehicles.

The kinematic sensor device 105 is configured to capture an acceleration of the vehicle 100 against the gravity direction G, a roll rate of the vehicle 100, and a yaw rate of the vehicle 100. The roll rate of the vehicle 100 may be defined by an angular velocity of the vehicle 100 about its longitudinal axis L as is symbolically shown in FIG. 3 by arrow A1. The yaw rate of the vehicle 100 may be defined by an angular velocity of the vehicle 100 about its vertical axis V as is symbolically shown in FIG. 3 by arrow A2. The kinematic sensor device 105 may for example include a gyroscope and optional further acceleration sensors.

The wheel speed sensors 106-109 are configured to capture the wheel speed of wheels 101L, 101R, 102L, 102R, wherein one wheel speed sensor 106, 107, 108, 109 is assigned to one wheel, respectively. The wheel speed sensors 106-109 may be of conventional configuration. A further description is therefore omitted.

The brake system 2 includes a controller 1 and a hydraulic brake circuit 3. The hydraulic brake circuit 3 may include various hydraulic components 30 such as a pressurizing device such as plunger for pressurizing a brake fluid, wheel cylinders driven by the brake fluid for applying a frictional brake force to each wheel, and valves and/or hydraulic pumps for individually varying the brake pressure of the brake fluid and thus the brake force at the respective wheel. The hydraulic brake circuit 3 is generally configured to apply a braking force to each wheel 101L, 101R, 102L, 102R of the vehicle 100, in particular the brake circuit 3 is configured to apply an individual braking force to each wheel 101L, 101R, 102L, 102R, and specifically to periodically vary the braking force of each wheel 101L, 101R, 102L, 102R individually in an ABS braking operation or for performing an electronically controlled stability control operation (ESC operation) of the vehicle 100.

As schematically shown in FIG. 1, the controller 1 includes an input interface or first connection interface 1A, and an output interface or second connection interface 1B. The first and second connection interfaces 1A, 1B are configured for data communication. In particular, electrical, electromagnetic, or optical signals may be received and transmitted via the first and second connection interfaces 1A, 1B. For example, the first and second connection interfaces 1A, 1B may be realized as CAN-BUS interface or similar interface. It is also possible to realize the first and second connection interfaces 1A, 1B as wireless interfaces such as a WIFI interface.

As schematically shown in FIG. 1, the second connection interface 1B is connected to the hydraulic brake circuit 3 for data communication. That is, signals such as command signals provided at the second connection interface 1B may be transmitted to the hydraulic brake circuit 3 for actuating the various hydraulic components 30 of the hydraulic brake circuit 3. For example, a control command generated by the controller 1 or received by the controller 1 and provided by the controller 1 at the second connection interface 1B may be transmitted to valves of the hydraulic brake circuit 3 to cause opening or closing the valve. Generally, the hydraulic brake circuit 3 is configured to apply a braking force to each wheel 101L, 101R, 102L, 102R of the vehicle 100 in accordance with a control command.

As further shown in FIG. 1, the controller 1 includes a data storage 10 and a computer 20 configured to read data from the data storage 10. The data storage 10 may in particular be a non-transitory data storage medium 10 such as a Flash drive or a hard drive. The data storage 10 may store software readable by the computer 20, wherein the software is configured to cause the computer 20 to execute the steps of a method for braking the vehicle 100 and to generate corresponding control commands which are then provided at the second connection interface 1B. The computer 20 and the data storage 10 may for example be realized together as a micro controller. Of course the computer 20 and the data storage 10 may also be realized as separate components with the computer 20 being a CPU, an application-specific integrated circuit (ASIC), or a FPGA, for example.

As is further shown in FIG. 1, the kinematic sensor device 105 and the wheel speed sensors 106-109 are connected to the first connection interface 1A of the controller 1. Thereby, the controller 1 receives data containing the wheels speed of each wheel 101L, 101R, 102L, 102R captured by the wheel speed sensors 106-109, data containing at least one of the roll rate of the vehicle 100 and an acceleration of the vehicle 100 against the direction of gravity G captured by one or more sensors of the kinematic sensor device 105, and data containing the yaw rate of the vehicle 100 captured by a sensor of the kinematic sensor device 105.

Figure 2:
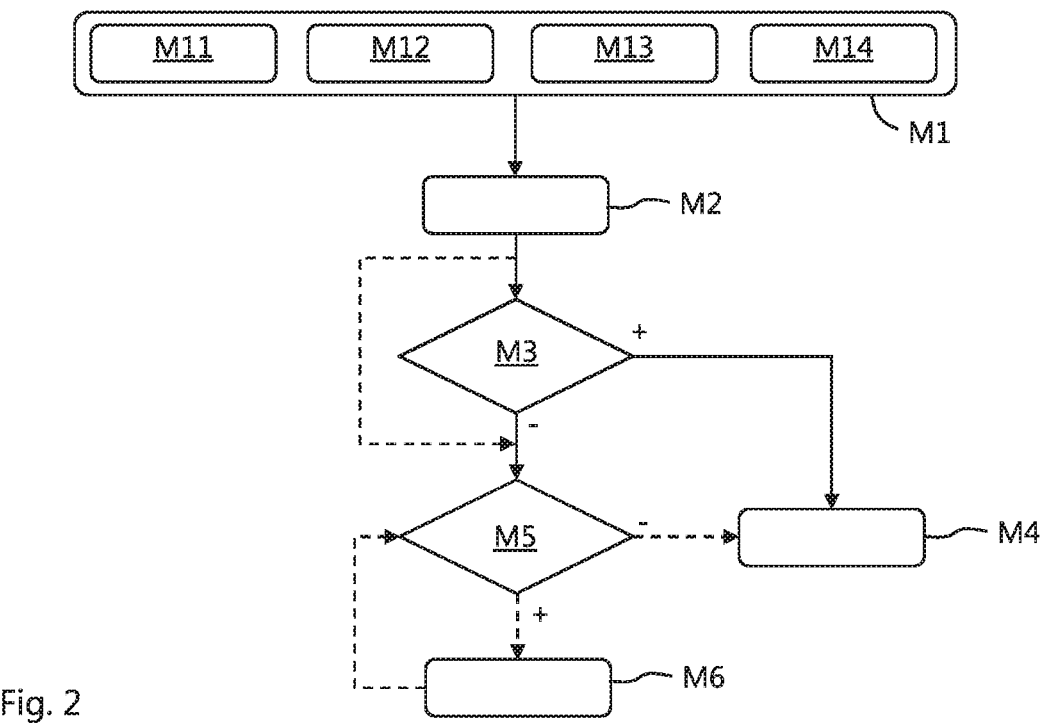
FIG. 2 shows a flow diagram of a method according to an aspect of the disclosure.

The controller 1 is in particular configured to perform a method as shown in FIG. 2. For example, the data storage 10 may store software configured to cause the computer 20 to execute a method as will be described in the following with reference to FIG. 2.

FIG. 2 shows a flow diagram of a method for braking the vehicle 100. As shown in block M1, at least one of a roll rate of the vehicle 100 (block M12) and an acceleration of the vehicle 100 (block M11) against gravity direction G are captured as a bump parameter. For example, these parameters may be captured by the kinematic sensor device 105 as described above and transmitted to the controller 1 via the first connection interface 1A.

The bump parameter indicate whether the vehicle 100 drives over an obstacle at the road surface S or on a substantially even road surface S. For example, FIG. 3 shows a situation which may occur when the vehicle 100 passes a curb K of a road surface S. Generally, in such situations due to dynamic forces acting to the vehicle 100, a contact force between one or more wheels 101L, 101R, 102L, 102R may be reduced or even become zero. The latter situation occurs when one or more wheels 101L, 101R, 102L, 102R are lifted as is exemplarily shown on the left hands side part of FIG. 3 where the right wheels 101R, 102R of both axles 101, 102 are lifted from the road surface S.

FIG. 3 on the right hands side part shows a plan view in the direction of gravity G to the road surface S with the vehicle 100 shown in three consecutive positions P1, P2, P3. Beneath this presentation of the road surface S in FIG. 3 a diagram D3 is shown having an abscissa x which corresponds to an axis of time, a first ordinate y1 which scales the acceleration of the vehicle 100 against gravity direction G, and a second ordinate y2 which scales a brake force applied to the wheels 101L, 101R, 102L, 102R. As can be taken from FIG. 3 the acceleration of the vehicle 100 against gravity direction G, which is depicted in FIG. 3 by the full line marked with crosses, includes a peak at a point of time which corresponds to a position P0 of the vehicle shown in the left hands side part of FIG. 3. At this position, the vehicle 100 passes the curb k and the right wheels 101R, 102R are being lifted from the road surface S. This peak is above a threshold value for the acceleration of the vehicle 100 against gravity direction G and thus indicates that the vehicle 100 has passed an obstacle.

A further bump parameters is given by the roll rate of the vehicle 100 which may be used in addition or alternative to the acceleration of the vehicle 100 against gravity direction G. FIG. 5 exemplarily shows a diagram D5 having an abscissa x representing the time axis and a ordinate y scaling the roll rate of the vehicle. As can be taken from FIG. 5, the roll rate remarkably increases at P0, that is, when the right wheels 101R, 102R of the vehicle lift as indicated in FIG. 3. Thus, when the roll rate of the vehicle 100 exceeds a predetermined threshold value the roll rate indicates that the vehicle 100 has passed an obstacle.

For example, FIG. 4 shows a diagram D4 having an abscissa x representing the time axis, a first ordinate y1 in the lower part of the diagram D4, the first ordinate y1 scaling the wheel speed of one wheel of a non-driven axle of the vehicle, and a second ordinate y2 in the upper part of the diagram D4, the second ordinate y2 scaling the wheel speed of one wheel of a driven axle of the vehicle. As is indicated by P0 on the time axis x of diagram D4, which corresponds to the point of time when the right wheels 101R, 101L of the vehicle 100 lift as indicted in FIG. 3, the wheel speed of the wheel of the driven axle increases to a peak value and thus exceeds a threshold value while the wheel speed of the wheel of the non-driven axle drops under a threshold value. Thus, the wheel speed of one wheel of the driven axle or of one wheel of the non-driven axle may serve as an additional bump parameter helping to determine whether the vehicle 100 has passed an obstacle.

Further, as shown in block M1, a yaw rate of the vehicle 100 is captured (block M14), for example by the kinematic sensor device 105 as described above and transmitted to the controller 1 via the first connection interface 1A. Moreover, a wheel speed of each wheel 101L, 101R, 102L, 102R is captured (block M13), e.g. by the wheel speed sensors 106-109 and transmitted to the controller 1 via the first connection interface 1A.

Block M2 depicts start of a braking operation of the vehicle 100. That is, a brake force is applied to the wheels by means of the hydraulic brake circuit 3 based on a command signal generated or forwarded by the controller 1 or based on a control command generated by another control structure such as a brake lever (not shown). In FIGS. 3-5, the braking operation is initiated approximately at position P1.

A slip rate of each wheel 101L, 101R, 102L, 102R is determined based on the captured wheel speeds. For example, the controller 1 may be configured to calculate a mean value of the received wheel speeds and to calculate a difference between each wheel speed and the mean value of the wheel speeds representing a parameter that indicates a slip rate.

At block M3, it is determined whether the bump parameter exceeds a predetermined bump parameter threshold. That is, it is determined whether, for example, the roll rate and/or the acceleration of the vehicle 100 against gravity direction G exceed a threshold. Optionally, further bump parameters such as the wheel speeds may be investigated as a bump parameter as described above with reference to FIG. 4.

When it is determined at block M3 that the bump parameter exceeds the predetermined bump parameter threshold, as indicated in FIG. 2 by the symbol "+", a first anti-locking brake system operation is performed which is symbolically shown in FIG. 2 by block M4. In particular, the controller 1 may generate a first control command and transmitting this first control command via the second connection interface 1B to the hydraulic brake circuit 3 for controlling the hydraulic components 30 of the brake circuit 3 accordingly.

The first anti-locking brake system operation includes applying a first braking force to the each wheel 101L, 101R 102L, 102R, wherein the first braking force is controlled such that a slip rate of each wheel 101L, 101R, 102L, 102R lies within a predetermined first range. This is exemplarily shown in diagram D3 of FIG. 3. In diagram D3, the braking force applied to the left wheel 101L of the first axle 101 is indicated by the full line FL, the braking force applied to the right wheel 101R of the first axle 101 is indicated by the chain line FR, the braking force applied to the left wheel 102L of the second axle 102 is indicated by the dotted line RL, and the braking force applied to the right wheel 102R of the second axle 102 is indicated by the dashed line RR. As can be seen in diagram D3 of FIG. 3, the brake force applied to the wheels 101L, 101R of the first axle 101 are substantially equal and thus lie in a first range. The brake force applied to the wheels 102L, 102R of the second axle 102 are substantially equal but smaller than the brake force of the wheels 101L, 101R of the first axle 101 and thus lie in a second range. As can be further seen in diagram D3 of FIG. 3, the brake force applied to the wheels 101L, 101R, 102L, 102R varies over time in a zig-zag-pattern within the respective first and second range which is due to the anti-locking character of the brake operation.

Optionally, in the first anti-locking brake system operation, the first slip rate range is set such that a difference in the slip rates of the wheels is smaller than 10 percent, preferably smaller than 5 percent. In other words, the brake force is controlled such that all wheels 101L, 101R, 102L, 102R have substantially the same slip rate.

When it is determined at block M3 that the bump parameter is below the predetermined bump parameter threshold, as indicated in FIG. 2 by the symbol "−", the method moves to block M5. In block M5 it is determined whether the slip rate of one or more of the wheels 101L, 101R, 102L, 102R exceeds a predetermined slip rate threshold. This may for example be the case, when the left wheels 101L, 102L are in contact with a road surface S having a different friction or roughness than a road surface S with which the right wheels 101R, 102R are in contact. This could lead to skidding of the vehicle when the slip rate of the left wheels 101L, 102L differs from the slip rate of the right wheels 101R, 102R by more than a threshold value.

When it is determined in block M5 that the slip rate of one or more of the wheels 101L, 101R, 102L, 102R exceeds the predetermined slip rate threshold, as indicated by symbol "+" in FIG. 2, a second anti-locking brake system operation is performed which is depicted in FIG. 2 as block M6. In particular, the controller 1 may generate a second control command and transmitting this first control command via the second connection interface 1B to the hydraulic brake circuit 3 for controlling the hydraulic components 30 of the brake circuit 3 accordingly.

In FIGS. 3 and 4, the first anti-locking brake system operation starts at position P1. As can be seen in FIG. 4, the wheel speeds first drop between P1 and P2 and are then controlled to fall within a common range. Between P2 and P3, the wheel speeds are decreased and, thereby, the vehicle body speed is continuously decreased as indicated in FIG. 4 by the dotted line.

The second anti-locking brake system operation may include applying a second braking force to each wheel 101L, 101R, 102L, 102R, wherein the second braking force is controlled such that the slip rate of each wheel is set so that the yaw rate of the vehicle lies within a predetermined yaw rate range.

The second anti-locking brake system operation is exemplarily shown in FIG. 6. FIG. 6 exemplarily shows on the left hands side part a situation where the vehicle 100 is driving with its left wheels 101L, 102L on a road surface S1 having a high friction value and with its right wheels 101R, 102R on a road surface S2 having a low friction value. When the vehicle 100 is braked, the right wheels 101R, 102R tend to have a high slip rate, that is, they tend to block. This may cause a high yaw rate of the vehicle 100 and skidding of the vehicle 100 may occur. This situation may for example be detected based on the wheel speeds. When the vehicle is braked at position P1 in the situation shown in FIG. 6, the wheel speeds of the right wheels 101R, 102R may drop as show in FIG. 4 at P1.

FIG. 6 on the right hands side part shows a plan view in the direction of gravity G to the road surface S with the vehicle 100 shown in three consecutive positions P1, P2, P3. Beneath this presentation of the road surface S, a diagram D6 is shown in FIG. 6, the diagram D6 having an abscissa x which corresponds to an axis of time, a first ordinate y1 which scales the acceleration of the vehicle 100 against gravity direction G, and a second ordinate y2 which scales a brake force applied to the wheels 101L, 101R, 102L, 102R.

In diagram D6 in the lower part of FIG. 6 the braking force applied to the left wheel 101L of the first axle 101 is indicated by the full line FL, the braking force applied to the right wheel 10R of the first axle 101 is indicated by the chain line FR, the braking force applied to the left wheel 102L of the second axle 102 is indicated by the dotted line RL, and the braking force applied to the right wheel of the second axle 102 is indicated by the dashed line RR.

As can be seen in diagram D6 of FIG. 6, the acceleration of the vehicle in the gravity direction G is constant, that is, there is no indication that the vehicle 100 has passed an obstacle such as a curb K. As can be seen further, the brake force applied to the right wheel 101R of the first axle 101 is much lower as the brake force applied to the left wheel 101L of the first axle 101. Thereby, the slip rate of the right wheel 101R of the first axle 101, which is in contact with the road surface S2 having a low friction value, is decreased such that the yaw rate of the vehicle 100 is limited. This stabilizes the vehicle behavior and avoids skidding of the vehicle 100.

When it is determined in block M5 that the slip rate of one or more of the wheels 101L, 101R, 102L, 102R is below the predetermined slip rate threshold, as indicated by symbol "−" in FIG. 2, the first anti-locking brake system operation may be performed as has been described above.

As is further shown in FIG. 2, the method may operate in a closed loop. That is, when performing the second anti-locking brake system operation, it may be periodically detected whether the slip rate of one of the wheels exceeds the predetermined threshold value (block M5).

One of the technical benefits of the method described above becomes apparent from FIG. 2 by the dashed lines. Without block M3, it would not be detected in the situation of FIG. 3 that the vehicle 100 has passed an obstacle, i.e. the curb K. Thus, since the right wheels 101R, 102R are lifted, the wheel speed of the right wheels 101R, 102R drops and, thus, the slip rate of those wheels 101R, 102R exceeds the slip rate threshold value. This would be detected at block M5 and consequently the second anti-locking brake system operation would be initiated (block M6). Since the determination step of block M5 is repeated periodically, it would be detected at earliest in the second loop, when the right wheels 1013, 102R have again contacted the road surface S, that the actual wheel slip of the right wheels is not above the threshold value, and the first anti-locking brake system operation would be performed (block M4). This extra loop takes time and thus increases the braking distance of the vehicle. By providing block M3 for determining whether a bump parameter exceeds a threshold, the first anti-locking brake system operation block M4 can be directly entered and thus the brake distance can be reduced.

Although the here afore-mentioned method, controller, and brake system each have been described in connection to automobiles, it is clearly and unambiguously understood for a person skilled in the art that the here described aforementioned method, controller, and brake system can be applied to various vehicles, in particular various multi-track vehicles.

The disclosure has been described in detail referring to exemplary aspects. However, it will be appreciated by those of ordinary skill in the art that modifications to these aspects may be made without deviating from the principles and central ideas of the disclosure.

REFERENCE LIST

1 control device
1A first connection interface
1B second connection interface
2 brake system
3 hydraulic brake circuit
10 data storage medium
20 computer
30 hydraulic components
100 vehicle
101 first axle
102 second axle
101L left wheel of first axle
101R right wheel of first axle
102L left wheel of second axle
102R right wheel of second axle
105 kinematic sensor device
106-109 wheel speed sensors
A1 arrow
A2 arrow
D3 diagram
D4 diagram
D5 diagram
D6 diagram
P0 position of vehicle when wheels are lifted
P1-P3 consecutive positions of vehicle after position P0
G gravity direction
K curb
L longitudinal axis of the vehicle
M1-M14 method blocks
S road surface
S1, S2 road surfaces of different friction value
V vertical axis of the vehicle

What is claimed is:

1. A method for braking a vehicle including a first axle and a second axle, each axle comprising two wheels, the method comprising:
    capturing a bump parameter comprising at least one of a roll rate of the vehicle and an acceleration of the vehicle against gravity direction;
    capturing a wheel speed of each wheel;
    capturing a yaw rate of the vehicle;
    determining a slip rate of each wheel based on the captured wheel speeds;
    performing a first anti-locking brake system operation when the bump parameter exceeds a predetermined bump parameter threshold, the first anti-locking brake system operation comprising applying a first braking force to the each wheel, wherein the first braking force is controlled such that a slip rate of each wheel lies within a predetermined first range; and
    performing a second anti-locking brake system operation when the bump parameter is below the predetermined bump parameter threshold and when the slip rate of one or more of the wheels exceeds a predetermined slip rate threshold, the second anti-locking brake system operation comprising applying a second braking force to each wheel, wherein the second braking force is controlled such that the slip rate of each wheel is set so that the yaw rate of the vehicle lies within a predetermined yaw rate range.

2. The method according to claim 1, wherein, in the first anti-locking brake system operation, the first slip rate range is set such that a difference in the slip rates of the wheels is smaller than 10 percent.

3. The method according to claim 1, wherein, in the first anti-locking brake system operation, the first slip rate range is set such that a difference in the slip rates of the wheels is smaller than 5 percent.

4. The method according to claim 1, further comprising:
    determining whether the wheel speed of one wheel of a driven axle of the first and second axles exceeds a predetermined upper wheel speed threshold.

5. The method according to claim 1, further comprising:
    determining whether the wheel speed of one wheel of a non-driven axle of the first and second axles falls below a predetermined lower wheel speed threshold.

6. A computer readable, non-transitory data storage medium storing a software program, the software program being configured to cause a computer to execute the steps of a method according to claim 1.

7. A Control device for a brake system of a vehicle including at least a first axle and a second axle, each axle comprising two wheels, the control device comprising:
    a first connection interface configured to receive data representing:

a bump parameter comprising at least one of a roll rate of the vehicle and an acceleration of the vehicle against gravity direction, data representing a wheel speed of each wheel of the vehicle, and data representing a yaw rate of the vehicle;

a second connection interface configured to transmit control commands to a hydraulic brake circuit of the brake system;

wherein the control device is configured to determine a slip rate of each wheel based on the received wheel speeds;

generate first control commands for the hydraulic brake circuit for a first anti-locking brake system operation when the bump parameter exceeds a predetermined bump parameter threshold, the first anti-locking brake system operation comprising applying a first braking force to the each wheel, wherein the first braking force is controlled such that a slip rate of each wheel lies within a predetermined first range; and generate second control commands for the hydraulic brake circuit for a second anti-locking brake system operation when the bump parameter is below the predetermined bump parameter threshold and when the slip rate of one or more of the wheels exceeds a predetermined slip rate threshold, the second anti-locking brake system operation comprising applying a second braking force to each wheel, wherein the second braking force is controlled such that the slip rate of each wheel is set so that the yaw rate of the vehicle lies within a predetermined yaw rate range.

8. The control device according to claim 7, wherein the control device comprises a non-transitory data storage medium and a computer configured to read data from the data storage medium and to generate the first and second control commands.

9. A brake system for a vehicle including at least a first axle and a second axle, each axle comprising two wheels, the brake system comprising:

a hydraulic brake circuit configured to apply a braking force to each wheel in accordance with a control command; and a control device according to claim 7, wherein the second connection interface is connected to the hydraulic brake circuit.

* * * * *